United States Patent [19]

Kono et al.

[11] Patent Number: 4,734,196
[45] Date of Patent: Mar. 29, 1988

[54] PROCESS FOR PRODUCING MICRO-POROUS MEMBRANE OF ULTRA-HIGH-MOLECULAR-WEIGHT ALPHA-OLEFIN POLYMER, MICRO-POROUS MEMBRANES AND PROCESS FOR PRODUCING FILM OF ULTRA-HIGH-MOLECULAR-WEIGHT ALPHA-OLEFIN POLYMER

[75] Inventors: Koichi Kono; Shoichi Mori; Kenji Miyasaka; Jyoichi Tabuchi, all of Saitama, Japan

[73] Assignee: Toa Nenryo Kogyo Kabushiki Kaisha, Tokyo, Japan

[21] Appl. No.: 832,916

[22] Filed: Feb. 24, 1986

[30] Foreign Application Priority Data

Feb. 25, 1985 [JP] Japan .................................. 60-34576
Feb. 25, 1985 [JP] Japan .................................. 60-34577
Feb. 25, 1985 [JP] Japan .................................. 60-34578

[51] Int. Cl.$^4$ .......................... C08J 9/28; B29C 55/12; B29C 43/00
[52] U.S. Cl. ............................. 210/500.36; 264/41; 264/53; 264/203; 264/204; 264/210.2; 264/288.8; 264/289.3; 264/290.2; 521/64; 521/142
[58] Field of Search ................... 264/41, 203, 53, 204, 264/210.2, 288.8, 289.3, 290.2; 210/500.36

[56] References Cited

U.S. PATENT DOCUMENTS 4,413,110 11/1983 Kavesh et al. .................. 526/348.1
4,536,536 8/1985 Kavesh et al. .................. 524/462
4,551,296 11/1985 Kavesh et al. .................. 264/203 X Primary Examiner—Philip Anderson
Attorney, Agent, or Firm—M. B. Kurtzman; C. E. Smith

[57] ABSTRACT

A micro-porous membrane of ultra-high-molecular-weight alpha-olefin polymer having a weight-average molecular weight greater than $5 \times 10^5$, the micro-porous membrane having through holes 0.01 to 1 micrometer in average pore size, with a void ratio from 30 to 90% and being oriented such that the linear draw ratio in one axis is greater than two and the areal draw ratio is greater than ten. The micro-porous membrane is obtained by forming a gel-like object from a solution of an alpha-olefin polymer having a weight-average molecular weight greater than $5 \times 10^5$, removing at least 10 wt % of the solvent contained in the gel-like object so that the gel-like object contains 10 to 90 wt % of alpa-olefin polymer, orientating the gel-like object at a temperature lower than that which is 10° C. above the melting point of the alpa-olefin polymer, and removing the residual solvent from the orientated product. A film is produced from the orientated product by pressing the orientated product at a temperature lower than that of the melting point of the alpha-olefin polymer.

6 Claims, 3 Drawing Figures

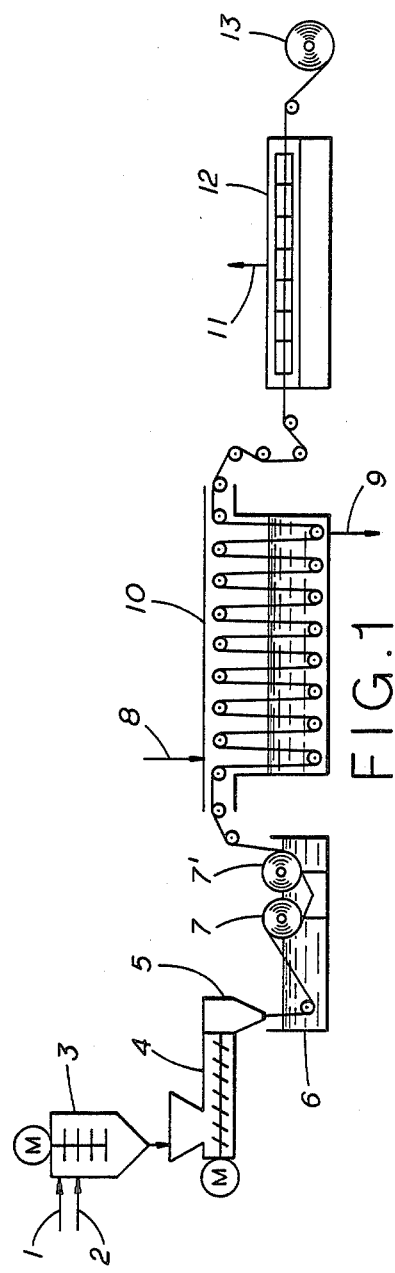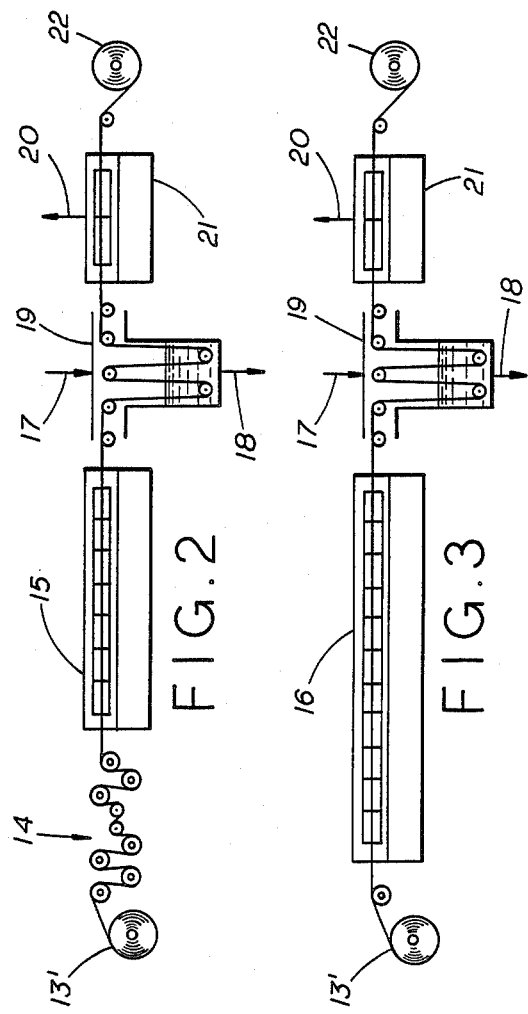

PROCESS FOR PRODUCING MICRO-POROUS MEMBRANE OF ULTRA-HIGH-MOLECULAR-WEIGHT ALPHA-OLEFIN POLYMER, MICRO-POROUS MEMBRANES AND PROCESS FOR PRODUCING FILM OF ULTRA-HIGH-MOLECULAR-WEIGHT ALPHA-OLEFIN POLYMER

DETAILED DESCRIPTION OF THE INVENTION

1. Field of industrial application

The present invention relates to a micro-porous membrane of an ultra-high-molecular-weight alpha-olefin polymer, a process for producing a micro-porous membrane of ultra-high-molecular-weight alpha-olefin polymer and to a process for producing film of an ultra-high-molecular-weight alpha-olefin polymer.

2. Prior art

Porous membranes find use as battery separators, electrolytic condenser separators, filters, moisture-permeable waterproof clothes, etc. in a variety of application areas. Recently there has arisen a demand for thinner and stronger ones where machines and equipment require reduction in size and weight and improvement in performance.

According to Japanese Patent Laid-open No. 74327/1983, a porous membrane of polypropylene, which is a typical example of alpha-olefin polymer, is produced by compounding polypropylene with an inorganic compound, casting the compounded polypropylene under a high shear force in a certain range of temperature gradient, and orienting the resulting cast film. The porous membrane obtained by this process is limited in the reduction of thickness and the increase of strength which are achieved by orientation, because the polypropylene that can be used is limited to one which has a molecular weight lower than 500,000. It is difficult to produce a thin membrane from ultra-high-molecular-weight polypropylene by the conventional extrusion molding and orientation technology because such polypropylene has a degree of molecular chain entanglement far greater than that of polypropylene having an ordinaly molecular weight.

An ultra-high-molecular-weight alpha-olefin polymer such as ultra-high-molecular-weight polypropylene is finding more uses as an engineering plastics because of its superior tensile modulus, tensile strength, wear resistance, chemical resistance, and impact resistance as compared with polypropylene of ordinary molecular weight. Since ultra-high-molecular-weight polypropylene has a degree of molecular chain entanglement far greater than that of polypropylene of ordinary molecular weight and hence has an extremely high melt viscosity and low fluidity, it is very difficult to make it into thin film by the conventional extrusion molding technology.

On the other hand, there is proposed in Japanese Patent Laid-open No. 5228/1983 a process for producing molded items from ultra-high-molecular-weight polypropylene. According to this process, a thermoplastic crystalline polymer having an ultra-high molecular weight which is essentially polyethylene or polypropylene, is dissolved in a non-volatile solvent, the resulting solution is made into a gel, and the gel containing the non-volatile solvent is heated and oriented or the gel is extracted with a volatile solvent to remove the non-volatile solvent and the resulting dried gel is heated and oriented. The molded item thus produced is essentially fiber. With this process, however, it is impossible to produce a micro-porous membrane of ultra-high-molecular-weight alpha-olefin polymer which has a large number of very minute through holes with a narrow pore size distribution and has a uniform high draw ratio. Also, in accordance with this process, it is very difficult to produce extremely thin, uniform orientated film of high draw ratio.

PROBLEMS TO BE SOLVED BY THE INVENTION

It is an object of the present invention to provide a thin, strong micro-porous membrane of ultra-high-molecular-weight alpha-olefin polymer having a large number of verY minute through holes with a narrow pore size distribution, to provide a process of producing said membrane by orienting gel of ultra-high-molecular-weight alpha-olefin polymer at a high draw ratio and to provide a process of producing thin film from ultra-high-molecular-weight alpha-olefin polymers.

BRIEF DESCRIPTION OF THE DRAWINGS

FIG. 1 is a schematic view of a process used to prepare the gel-like object of the present invention prior to orientation thereof.

FIG. 2 is a schematic view of a process for sequential biaxial orientation of the gel-like object of the present invention.

FIG. 3 is a schematic view of a process for simultaneous biaxial orientation of the gel-like object of the present invention.

Means to solve the problem

The present inventors made investigation into the process for preparing a micro-porous membrane of ultra-high-molecular-weight alpha-olefin polymer and orientated film of ultra-high-molecular-weight alpha-olefin polymer. As a result, it was found that such a membrane can be obtained from a gel-like object produced from a solution of ultra-high-molecular-weight alpha-olefin polymer. To make a membrane, the gel-like object undergoes desolvation so that it contains a certain amount of alpha-olefin polymer, and the desolvated gel-like object is oriented and the residual solvent is removed. The present invention for preparing the membranes and films was completed based on these findings.

The gist of this invention resides in a process for producing an orientated film and micro-porous membrane of ultra-high-molecular-weight alpha-olefin polymer. The process for producing the microporous membrane comprises the steps of forming a gel-like object from a solution of an alpha-olefin polymer having a weight-average molecular weight of about $5 \times 10^5$ or greater, removing at least 10 wt % of the solvent contained in the gel-like object so that the gel-like object contains 10 to 90 wt % of alpha-olefin polymer, orienting the gel-like object at a temperature lower than that which is 10° C. above the melting point of the alpha-olefin polymer, and removing the residual solvent from the oriented product. The process for producing the film comprises the further step of pressing the orientated product at a temperature lower than the melting point of the alpha-olefin polymer.

The ultra-high-molecular-weight alpha-olefin polymer used in this invention is one which has a weight-average molecular weight of about $5 \times 10^5$ or greater, desirably from about $5 \times 10^5$ to about $15 \times 10^6$, and preferably in the range of $1 \times 10^6$ to $15 \times 10^6$. With a weight-average molecular weight lower than $5 \times 10$, the polymer neither provides an extremely thin, strong microporous membrane nor a high-modulus, high-strength film characteristic of ultra-high-molecular-weight alpha-olefin polymer. Although there is no upper limit in molecular weight, one having a molecular weight in excess of about $15 \times 10^6$ is not readily made into a gel-like object which can be processed into a thin membrane by orientation or film.

Examples of such ultra-high-molecular-weight alpha-olefin polymers include crystalline homopolymers of propylene, 1-butene, 4-methyl-1-pentene, and 1-hexene, and copolymers of one of these alpha-olefins and less than 10 mol % of ethylene or other alphaolefins. Preferable among them is ultra-high-molecular-weight polypropylene composed mainly of propylene.

The above-mentioned ultra-high-molecular-weight alpha-olefin polymer may be incorporated with an antioxidant, ultraviolet absorber, slip agent, antiblocking agent, pigment, dye, and inorganic filler, and other additives as required within limits not harmful to the object of the invention.

The solution of ultra-high-molecular-weight alpha-olefin polymer used as a raw material in this invention is prepared by dissolving with heating the above-mentioned alpha-olefin polymer having a weight-average molecular weight of about $5 \times 10^5$ or greater in a solvent. The solvent is not specifically limited so long as it is capable of dissolving the alpha-olefin polymer. Examples of the solvent include aliphatic or cyclic hydrocarbons such as nonane, decane, undecane, dodecane, decalin, and paraffin oil, and fractions of mineral oils having a boiling point equivalent to that of the hydrocarbons. A non-volatile solvent such as paraffin oil is preferable to obtain a stable solvent-containing gel-like object. Dissolution with heating should be carried out by stirring the solution at a temperature at which the alpha-olefin polymer dissolves in the solvent completely. The temperature for dissolution varies depending on the polymer and solvent used. It is 160° to 250° C. for polypropylene. The concentration of the solution of alpha-olefin polymer varies depending on the molecular weight; preferably, it should be about 1 to about 10 wt. %. A solution of excessively high concentration tends to lack uniformity. It is desirable to add an antioxidant to the solution to protect the alpha-olefin polymer from degradation by oxidation.

The heated solution of alpha-olefin polymer is then extruded into a sheet or tube from a proper die or cast onto a proper support. The extrudate is cooled by water, air, or solvent at a rate of 50° C./min to a temperature lower than the gelling temperature, preferably 15 to 25° C., so that it gels. The thickness of the gel-like object is usually 0.1 to 5 mm. The gel-like object is swollen with the solvent used to dissolve the alpha-olefin polymer. This solvent has to be partially removed.

The desolvation may be accomplished by dipping the gel-like object in a readily volatile solvent as an extractant, followed by drying, or by compressing or heating the gel-like object. These methods may be used in combination with one another. Desolation by extraction with a readily volatile solvent is preferable because of its ability to remove the solvent without considerably changing the structure of the gel-like object. Examples of the readily volatile solvent include hydrocarbons such as pentane, hexane, and heptane; chlorinated hydrocarbons such as methylene chloride, and carbon tetrachloride; fluorinated hydrocarbons such as trifluoroethane; ethers such as diethyl ether and dioxane; and alcohols such as methanol, ethanol, and propanol. These solvents may be used individually or in combination with one another, and their selection depends on the solvent used to dissolve the alpha-olefin polymer.

At least 10 wt. % of the solvent in the gel-like object should be removed. In other words, the desolvation should be carried out such that after desolvation, the gel-like object contains 10 to 90 wt %, preferably 20 to 60 wt. % of ultra-high-molecular-weight alpha-olefin polymer. If the amount of desolvation is less than 10 wt. % and the amount of the alpha-olefin polymer in the gel-like object is less than 10 wt. %, the gel is liable to melt at the time of orientation with heating, because the reticulate structure of the gel-like object is highly swollen with the solvent. Moreover, such a gel-like object is not readily made into an oriented object of uniform thickness and narrow pore size distribution due to local uneven orientation, and is inconvenient to handle because the solvent oozes out during orientation. On the other hand, in the case of excessive desolvation where the amount of alpha-olefin polymer in the gel-like object exceeds 90 wt. %, the reticulate structure in the gel-like object becomes so dense that the gel-like object cannot be orientated at a high draw ratio and the resulting oriented product is poor in strength, has a small pore size and low void ratio and it is impossible to produce extremely thin, high-modulus, high strength film.

The amount of solvent to be removed from the gel-like object can be controlled by adjusting the amount of the readily volatile solvent for extraction, by adjusting the time of extraction, or by adjusting the force or compressing the gel-like object.

Where the gel-like object undergoes desolvation with a readily volatile solvent, the gel-like object shrinks or slacks in three axial directions as the readily volatile solvent evaporates. This should be avoided. The gel-like object should shrink selectively in the thickness direction so that it can be made into a smooth film that shrinks only a little in two axial directions (machine direction and transverse direction) and is capable of uniform orientation at a high draw ratio. The preferred shrinkage of the gel-like object is 50% or more, preferably 70% or more in the thickness direction and 20% or less in machine direction and transverse direction. The selective shrinking of the gel-like object may be accomplished by evaporating the readily volatile solvent while keeping it in close contact with a flat support, or by gripping it in two axial directions, or by holding it between two porous plates.

After desolvation, the gel-like object is oriented with heating in two axes at a certain draw ratio by tenter method, roll method, tubular method, or calendering method, or by a combination thereof. The biaxial orientation may be carried out simultaneously or sequentially.

The orientation temperature is lower than a temperature which is 10° C. above the melting point of the ultra-high-molecular-weight alpha-olefin polymer, preferably in the range of the crystal dispersion point to the melting point. In the case of polypropylene, it is 90° to 180° C., preferably 130° to 170° C. If the orientation temperature is higher than the melting point plus 10° C., the molecular orientation does not take place due to excessive melting of the resin. If the orientation temperature is lower than the crystal dispersion temperature, the film tends to break due to insufficient softening of the resin and the film cannot be oriented at a high draw ratio.

The draw ratio varies depending on the thickness of the film. The linear draw ratio in the direction of one axis should be greater than 2, preferably 5 to 20, and the areal draw ratio should be greater than 10. preferably 25 to 400. If the areal draw ratio is smaller than 10, no sufficient orientation takes place and the resulting membrane has a rather low void ratio. On the other hand, an areal draw ratio in excess of 400 is difficult to achieve due to limitations in orienting equipment and operation.

The micro-porous membrane obtained by orientation is dipped in the above-mentioned readily volatile solvent for extraction and removal of the residual solvent, and it is dried for evaporation of the volatile solvent. After extraction, the content of the residual solvent in the micro-porous membrane should be less than 1 wt%.

The micro-porous membrane of ultra-high-molecular-weight alpha-olefin polymer as described herein will have a thickness which is selected according to the application. It is usually 0.05 to 50 $\mu$m, and preferably 0.1 to 10 $\mu$m.

According to the process of this invention, it is possible to obtain a very thin micro-porous membrane of ultra-high-molecular-weight alpha-olefin polymer, said membrane having an average pore size of 0.01 to 1 $\mu$m for minute through holes, a void ratio of 30 to 90%, and a breaking strength greater than 100 kg/cm$^2$.

The oriented product obtained after desolvation is translucent due to microvoids contained therein. To make it transparent and produce the extremely thin film, it is necessary to press it at a temperature lower than the melting point of the alpha-olefin polymer constituting the oriented product. In the case of polypropylene, for example, this pressing step is accomplished by using a press or roll at 80° to 160° C. If the pressing temperature is higher than the melting point, heat shrinkage takes place in the oriented product; and if it is lower than 80° C., it is impossible to eliminate the microvoids in the oriented product and hence it is impossible to obtain transparent high-modulus, high-strength, extremely thin film.

The oriented film of ultra-high-molecular-weight alpha-olefin polymer produced according to the process of this embodiment of the invention will have a thickness of 0.05 to 10 $\mu$m, preferably 0.1 to 4 $\mu$m, which is selected according to the application.

According to the process of this embodiment of the invention, there is provided oriented film of ultra-high-molecular-weight alpha-olefin polymer, said oriented film having a tensile modulus greater than 1000 kg/cm$^2$, a breaking strength greater than 200 kg/cm$^2$, a haze value lower than 10%, preferably lower than 5%, and substantially no microvoids.

DESCRIPTION OF THE PREFERRED PROCESS

In FIG. 1 a dissolution vessel 3 is fed through line 1 with an ultra-high molecular weight alpha-olefin polymer such as polypropylene (UHMWPP) and to which is also fed through line 2 a nonvolatile solvent such as paraffin oil. The solution is prepared by dissolving the polymer with heating and mixing in the solvent.

The heated solution of UHMWPP is then extruded into a sheet 7 from a die 5 of extruder 4. The extruded sheet 7 is cooled by water bath 6 to a temperature lower than the gelling temperature, so that the extruded sheet gels. The cool gel-sheet 7' passes to a solvent extraction device 10 where a readily volatile solvent such as methylene chloride is fed in through line 8. The volatile solvent containing extracted nonvolatile solvent is recovered from a solvent outflow line 9. In a drying device 12, the volatile solvent 11 is evaporated from the extracted gel-sheet and then the gel-sheet 13 is rolled up. The gel-sheet 13' is oriented with heating in the machine direction (MD) and transverse direction (TD) sequentially by using a roll-type stretching machine 14 and a tender-type stretching machine 15, or in accordance with FIG. 2 the MD and TD is simultaneously performed by using a tenter-type stretching machine 16. The micro-porous membrane obtained by orientation passes to the nonvolatile solvent extraction device 19 where the volatile solvent is fed in through line 17 so as to remove the residual nonvolatile solvent in the membrane. The solvent outflow in line 18 contains the volatile solvent and all of the nonvolatile solvent contained in the membrane.

After extraction, the membrane is dried by dryer 21 for evaporating of the volatile solvent 20 and membrane 22 is rolled up.

EFFECT OF THE INVENTION

In accordance with membrane aspects of the invention, the process provides a very thin porous membrane of ultra-high-molecular-weight alpha-olefin polymer by orientation at a high draw ratio. The micro-porous membrane of ultra-high-molecular-weight alpha-olefin polymer thus obtained is superior to the conventional ones made of alpha-olefin polymer having an ordinary molecular weight. It is extremely thin and yet very strong, and it has minute through holes of uniform size and narrow size distribution.

Because of the above-mentioned outstanding characteristic properties, the micro-porous membrane of ultra-high-molecular-weight alpha-olefin polymer produced according to the process of this invention will find use as battery separators, electrolytic condenser separators, filters, and moisture-permeable water-proof clothes. Machines and equipment provided with it will be reduced in size and weight and improved in performance.

According to the film aspect of this invention, it is possible to produce extremely thin film from an ultra-high-molecular-weight alpha-olefin polymer by orientation of high draw ratio. The film is extremely thin and has high modulus and strength incomparable to those of conventional oriented film of alpha-olefin polymer of ordinary molecular weight.

Because of the above-mentioned outstanding characteristic properties, the oriented film of ultra-high-molecular-weight alpha-olefin polymer produced according to the process of this invention will find use as a packaging material and industrial material, for example, laminating material and electrical insulating material, especially condenser film.

EXAMPLES

The invention will be illustrated with the following examples. The test methods used in the examples are as follows:
(1) Thickness of film: Measured by observing the cross section of the membrane under a scanning electron microscope.
(2) Breaking strength: According to ASTM D882.
(3) Elongation at break: According to ASTM D882.

(4) Average pore size and pore size distribution: After vacuum deposition of gold, the surface of the micro-porous membrane is observed under a scanning electron microscope, and pores in the visual field are examined by an image analyzer for area-average pore size ($\phi S$), number-average pore size ($\phi N$), and pore size distribution ($\phi S/\phi N$). The number-average pore size is regarded as the average pore size.

(5) Void ratio: Measured with a mercury porosimeter.

(6) Tensile modulus: According to ASTM D882.

(7) Haze: According to JIS K6714.

EXAMPLE 1

Micro-porous Membrane

In an autoclave equipped with a stirrer was placed a mixture composed of 100 parts by weight of liquid paraffin (64 cst/40° C.) containing 4.0 wt. % of polypropylene (weight-average molecular weight ($\overline{M}w$)=4.7×10$^6$), 0.125 parts by weight of 2,6-di-t-butyl-p-cresol, and 0.25 parts by weight of tetrakis[methylene-3-(3, 5-di-t-butyl-4-hydroxyphenyl)propionate]methane (antioxidants). The mixtures was heated to 200° C. and stirred for 90 minutes to give a uniform solution.

The solution was filled in a heated mold, followed by rapid cooling to 15° C. Thus there was obtained a 2 mm thick gel-like sheet. This sheet was dipped in methylene chloride for 60 minutes. The wet sheet was stuck to a flat plate and dried on it. Thus there was obtained a sheet containing 19.4 wt% of polypropylene and having a shrinkage (in thickness direction) of 79.4%.

The sheet underwent simultaneous biaxial orientation of a biaxial stretching machine at 150° C., at a rate of 30 cm/min, and at a draw ratio of 8×8. The resulting oriented membrane was washed with methylene chloride to remove residual liquid paraffin, followed by drying. Thus there was obtained a micro-porous membrane of polypropylene having the characteristic properties as shown in Table 1.

EXAMPLES 2 to 6

Micro-porous membranes of polypropylene were prepared in the same manner as in Example 1 except that the orientation conditions were changed as shown in Table 1. The characteristic properties of the membranes are shown in Table 1.

EXAMPLE 7

A micro-porous membrane of polypropylene was prepared in the same manner as in Example 1 except that orientation was performed sequentially under the conditions shown in Table 1. The characteristic properties of the membrane are shown in Table 1.

COMPARATIVE EXAMPLE 1

A micro-porous membrane of polypropylene was prepared in the same manner as in Example 1 except that the gel-like sheet underwent biaxial orientation without the removal of solvent. The characteristic properties of the membrane are shown in Table 1. The membrane had a broad pore size distribution and was uneven in orientation. The membrane immediately after orientation was in such a condition that the surface was saturated with the oozed solvent which required a large amount of solvent for removal.

EXAMPLE 8

A micro-porous membrane of polypropylene was prepared in the same manner as in Example 1 except that a liquid paraffin solution containing 2.0 wt% of polypropylene was used and the orientation conditions were changed as shown in Table 1. The characteristic properties of the membrane are shown in Table 1.

EXAMPLE 9

A micro-porous membrane of polypropylene was prepared in the same manner as in Example 1 except that a liquid paraffin solution containing 6.0 wt% of polypropylene ($\overline{M}w$=2.5×10$^6$) was used and the orientation conditions were changed as shown in Table 1. The characteristic properties of the membrane are shown in Table 1.

COMPARATIVE EXAMPLE 2

A micro-porous membrane of polypropylene was prepared in the same manner as in Example 9 except that 9.0 wt% of liquid paraffin was removed from the gel-like sheet and the orientation conditions were changed as shown in Table 1. The characteristic properties of the membrane are shown in Table 1. The membrane had a broad pore size distribution and was uneven in orientation. The membrane immediately after orientation was in such a condition that the surface was saturated with the oozed excess solvent.

COMPARATIVE EXAMPLE 3

A micro-porous membrane of polypropylene was prepared in the same manner as in Example 8 except that 50 wt% of liquid paraffin was removed from the gel-like sheet and the orientation conditions were changed as shown in Table 1. The characteristic properties of the membrane are shown in Table 1. The membrane had a broad pore size distribution and was uneven in orientation. The membrane immediately after orientation was in such a condition that the surface was saturated with the oozed excess solvent.

COMPARATIVE EXAMPLE 4

The gel-like sheet formed in Example 1 was dipped in a large amount of methylene chloride for 60 minutes. The wet sheet was stuck to a flat plate and dried on it. Thus there was obtained a sheet containing substantially no liquid paraffin. The sheet underwent biaxial orientation on a biaxial stretching machine at 110° to 170° C. and at a rate of 30 cm/min. It was impossible to perform orientation at a draw ratio greater than 3×3 due to breaking and uneven stretching.

EXAMPLE 10

FILM

In an autoclave equipped with a stirrer was placed a mixture composed of 100 parts by weight of liquid paraffin (64 cst/40° C.) containing 4.0 wt % of polypropylene (weight-average molecular weight ($\overline{M}w$)=4.7×10$^6$), 0.125 parts by weight of 2,6-di-t-butyl-p-cresol, and 0.25 parts by weight of tetrakis[methylene-3-(3,5-di-t-butyl-4-hydroxyphenyl) propionate]methane (antioxidants). The mixture was heated to 200° C. and stirred for 90 minutes to give a uniform solution.

The solution was filled in a heated mold, followed by rapid cooling to 15° C. Thus there was obtained a 2 mm thick gel-like sheet. This sheet was dipped in methylene chloride for 60 minutes. The wet sheet was stuck to a flat plate and dried on it. Thus there was obtained a sheet containing 19.4 wt % of polypropylene and having a shrinkage (in thickness direction) of 79.4%.

The sheet underwent simultaneous biaxial orientation on a biaxial stretching machine at 150° C., at a rate of 30 cm/min, and at a draw ratio of 8×8. The resulting oriented film was washed with methylene chloride to remove residual liquid paraffin, followed by drying. Thus there was obtained an oriented product.

The oriented product was pressed at 120° C. under a load of 200 kg/cm²G for 10 minutes. The extremely thin film of polypropylene thus obtained had the characteristic properties as shown in Table 2.

EXAMPLES 11 to 15

Polypropylene films were prepared in the same manner as in Example 10 except that the film-making conditions were changed as shown in Table 2. The characteristic properties of the films are shown in Table 2.

EXAMPLE 16

Polypropylene film was prepared in the same manner as in Example 10 except that orientation was performed sequentially under the conditions shown in Table 2. The characteristic properties off the film are shown in Table 2.

EXAMPLE 17

Polypropylene film was prepared in the same manner as in Example 10 except that a liquid paraffin solution containing 6.0 wt % of polypropylene ($\overline{M}w=2.5\times10^6$) was used and the film-making conditions were changed as shown in Table 2. The characteristic properties of the film are shown in Table 2.

COMPARATIVE EXAMPLE 5

Polypropylene film was prepared in the same manner as in Example 10 except that the gel-like sheet underwent biaxial orientation at 130° C. without the removal of solvent. The resulting film was uneven and in such condition that the surface was saturated with the oozed solvent which made handling inconvenient.

COMPARATIVE EXAMPLE 6

The gel-like sheet formed in Example 10 was dipped in a large amount of methylene chloride for 60 minutes. The wet sheet stuck to a flat plate and dried on it. Thus there was obtained a sheet containing substantially no liquid paraffin. The sheet underwent biaxial orientation on a biaxial stretching machine at 110° to 170° C. and at a rate of 30 cm/min. It was impossible to perform orientation at a draw ration greater than 3×3 due to breaking and uneven stretching and hence it was impossible to obtain extremely thin film.

COMPARATIVE EXAMPLE 7

Polypropylene film was prepared in the same manner as in Example 10 except that a liquid paraffin solution containing 14.0 wt % of polypropylene or ordinary molecular weight ($\overline{M}w=19.5\times10^4$) was used. It was impossible to perform orientation at a draw ratio greater than 3×3 due to breaking and uneven stretching and hence it was impossible to obtain extremely thin film.

COMPARATIVE EXAMPLE 8

Polypropylene film was prepared in the same manner as in Example 17 except that 9.0 wt % of liquid paraffin was removed from the gel-like sheet so that the gel-like sheet contained 7.0 wt % of polypropylene and orientation was carried out at 130° C. The resulting film was uneven.

TABLE 1

| | Orientation conditions | | | Characteristic properties of micro-porous membrane of polypropylene | | | | | | |
|---|---|---|---|---|---|---|---|---|---|---|
| Example | Polypropylene in gel-like (wt %) | Orientation temperature (°C.) | Draw Ratio (MD × TD) | Membrane Thickness (μm) | Breaking strength (kg/cm²) | Elongation at break (%) | Area-average pore size φS (μm) | Number-average pore size φN (μm) | Pore size distribution φS/φN | Void Ratio (%) |
| 1 | 19.4 | 150 | 8 × 8 | 1.8 | 180 | 81 | 0.234 | 0.149 | 1.58 | 35.8 |
| 2 | 35.0 | 150 | 8 × 8 | 2.5 | 750 | 52 | 0.057 | 0.042 | 1.35 | 75.0 |
| 3 | 37.1 | 160 | 8 × 8 | 1.5 | 270 | 93 | 0.232 | 0.153 | 1.51 | 31.4 |
| 4 | 62.4 | 170 | 8 × 8 | 1.7 | 330 | 70 | 0.025 | 0.019 | 1.32 | 37.9 |
| 5 | 51.4 | 140 | 5 × 5 | 3.7 | 240 | 110 | 0.216 | 0.120 | 1.80 | 45.2 |
| 6 | 44.5 | 160 | 10 × 10 | 1.2 | 910 | 65 | 0.038 | 0.029 | 1.33 | 82.0 |
| 7 | 37.8 | 155 | 8 × 8 | 2.1 | 660 (MD) 460 (TD) | 80 (MD) 92 (TD) | 0.102 | 0.071 | 1.43 | 58.1 |
| 8 | 40.2 | 150 | 8 × 8 | 1.1 | 850 | 72 | 0.610 | 0.430 | 1.42 | 73.5 |
| 9 | 36.0 | 150 | 8 × 8 | 2.8 | 590 | 65 | 0.049 | 0.035 | 1.40 | 62.1 |
| 1* | 4.0 | 130 | 8 × 8 | 2.0 | 350 | 163 | 0.353 | 0.075 | 4.70 | 50.2 |
| 2* | 7.0 | 135 | 8 × 8 | 2.5 | 420 | 135 | 0.295 | 0.076 | 3.90 | 55.6 |
| 3* | 4.1 | 130 | 8 × 8 | 1.2 | 410 | 142 | 0.330 | 0.083 | 4.00 | 60.5 |

*Comparative Examples
MD: Machine direction,
TD: Transverse direction

TABLE 2

| | Film-making conditions | | | Characteristic properties of oriented film | | | | | |
|---|---|---|---|---|---|---|---|---|---|
| Example | Polypropylene in gel-like sheet (wt %) | Orientation temperature (°C.) | Draw Ratio (MD × TD) | Pressing temperature (°C.) | Film Thickness (μm) | Tensile modulus (kg/cm²) | Breaking strength (kg/cm²) | Elongation at break (%) | Haze value (%) |
| 1 | 19.4 | 150 | 8 × 8 | 120 | 1.1 | 2210 | 410 | 48 | 1.6 |
| 2 | 35.0 | 150 | 8 × 8 | 130 | 1.0 | 6290 | 1070 | 45 | 1.4 |
| 3 | 37.1 | 160 | 8 × 8 | 140 | 0.9 | 4410 | 320 | 24 | 1.8 |

TABLE 2-continued

| | Film-making conditions | | | Characteristic properties of oriented film | | | | | |
|---|---|---|---|---|---|---|---|---|---|
| Example | Polypropylene in gel-like sheet (wt %) | Orientation temperature (°C.) | Draw Ratio (MD × TD) | Pressing temperature (°C.) | Film Thickness (μm) | Tensile modulus (kg/cm$^2$) | Breaking strength (kg/cm$^2$) | Elongation at break (%) | Haze value (%) |
| 4 | 52.4 | 170 | 8 × 8 | 140 | 1.1 | 1450 | 940 | 63 | 1.2 |
| 5 | 51.4 | 140 | 5 × 5 | 120 | 1.8 | 970 | 480 | 80 | 2.1 |
| 6 | 44.5 | 160 | 10 × 10 | 140 | 0.8 | 8140 | 1770 | 61 | 1.2 |
| 7 | 37.8 | 155 | 8 × 8 | 130 | 1.0 | 3530 (MD) 1780 (TD) | 1130 (MD) 920 (TD) | 48 (MD) 73 (TD) | 1.4 |
| 8 | 36.0 | 150 | 8 × 8 | 130 | 1.5 | 5120 | 970 | 32 | 1.6 |

MD: Machine direction,
TD: Transverse direction

What is claimed is:

1. A micro-porous membrane of ultra-high-molecular-weight alpha-olefin polymer having a weight-average molecular weight of about $5 \times 10^5$ or greater, said micro-porous membrane having holes 0.01 to 1 micrometer in average pore size. with a void ratio of from about 30 to 90% and being orientated such that the linear draw ratio in one axis is greater than two and the areal draw ratio is greater than 10.

2. A process for producing a micro-porous membrane of ultra-high-molecular-weight alpha-olefin polymer which comprises the steps of:
   (A) forming a gel-like object from a solution of an alpha-olefin polymer having a weight-average molecular weight of about $5 \times 10^5$ or greater,
   (B) removing at least 10 wt. % of the solvent contained in the gel-like object so that the gel-like object contains 10 to 90 wt. % of the alpha-olefin polymer,
   (C) biaxially orientating the gel-like object obtained from step (B) at a temperature lower than that which is 10° C. above the melting point of the alpha-olefin polymer and at a linear draw ratio greater than 2 and an areal draw ratio greater than 10, and
   (D) removing the residual solvent from the orientated product thereby obtaining a micro-porous membrane having a void ratio of 30 to 90%.

3. The process in accordance with claim 2 wherein the alpha-olefin polymer is polypropylene.

4. The proess in accordance with claim 2 wherein the alpha-olefin polymer is polypropylene.

5. The micro-porous membrane in accordane with claim 2 wherein the alpha-olefin polymer is polypropylene.

6. A process for producing film of ultra-high-molecular-weight alpha-olefin polymer which comprises the steps of:
   (A) forming a gel-like object from a solution of an alpha-olefin polymer having a weight-average molecular weight of about $5 \times 10^5$ or greater,
   (B) removing at least 10 wt. % of the solvent contained in the gel-like object so that the gel-like object contains 10 to 90 wt. % of the alpha-olefin polymer,
   (C) biaxially orientating the gel-like object at a temperature lower than that which is 10° C. above the melting point of the alpha-olefin polymer at a linar draw ratio greater than 2 and an areal draw ratio greater than 10,
   (D) removing the residual solvent from the orientated product thereby obtaining a micro-porous membrane having a void ratio of 30 to 90%, and
   (E) pressing the orientated product at a temperature lower than the melting point of the alpha-olefin polymer.

* * * * *